(12) United States Patent
Zhan

(10) Patent No.: US 11,310,761 B2
(45) Date of Patent: Apr. 19, 2022

(54) POSITIONING METHOD AND SYSTEM BASED ON WI-FI INTERNET OF THINGS DEVICE NETWORK

(71) Applicant: Espressif Systems (Shanghai) Co., Ltd., Shanghai (CN)

(72) Inventor: Rui Zhan, Shanghai (CN)

(73) Assignee: Espressif Systems (Shanghai) Co., Ltd., Shanghai (CN)

( * ) Notice: Subject to any disclaimer, the term of this patent is extended or adjusted under 35 U.S.C. 154(b) by 213 days.

(21) Appl. No.: 16/489,877

(22) PCT Filed: Apr. 24, 2018

(86) PCT No.: PCT/CN2018/084186
§ 371 (c)(1),
(2) Date: Aug. 29, 2019

(87) PCT Pub. No.: WO2018/210107
PCT Pub. Date: Nov. 22, 2018

(65) Prior Publication Data
US 2021/0282112 A1    Sep. 9, 2021

(30) Foreign Application Priority Data

May 18, 2017   (CN) ............................ 20170353122.2

(51) Int. Cl.
*H04W 64/00*      (2009.01)
*G01S 5/02*       (2010.01)
(Continued)

(52) U.S. Cl.
CPC ......... *H04W 64/006* (2013.01); *G01S 5/0284* (2013.01); *H04L 67/125* (2013.01); *H04W 4/023* (2013.01); *H04W 56/0015* (2013.01)

(58) Field of Classification Search
CPC .......... H04W 64/006; H04W 56/0015; H04W 4/023; H04W 4/33; H04W 4/70;
(Continued)

(56) References Cited

U.S. PATENT DOCUMENTS

2009/0209268 A1    8/2009  Ha et al.
2014/0361928 A1*  12/2014  Hughes ................... G01S 19/48
                                                       342/463

(Continued)

FOREIGN PATENT DOCUMENTS

CN         101374155       2/2009
CN         103513229       1/2014
(Continued)

*Primary Examiner* — Michael Y Mapa
(74) *Attorney, Agent, or Firm* — Reinhart Boerner Van Deuren P.C.

(57) ABSTRACT

The present invention relates to a positioning method and system based on a Wi-Fi IoT device network, wherein positioning monitoring nodes in a subnet respectively receives, within an information receiving and transmitting range thereof, a data packet sent by a same positioning target device, records corresponding data packet receipt clock information, and provides the data packet receipt clock information and identification information of the positioning target device to the subnet master node; the subnet master node utilizes signal arrival time differences between a plurality of positioning monitoring nodes receiving the data packet from the same positioning target device, and mutual physical distances between the positioning monitoring nodes, to compute the distance differences of the positioning target device with respect to the plurality of positioning monitoring nodes, and determine a position of the positioning target device in a physical coverage range of the subnet. The present invention may achieve the real-time positioning and monitoring of a large number of targets in a large physical range.

9 Claims, 2 Drawing Sheets

(51) Int. Cl.
*H04L 29/08* (2006.01)
*H04W 4/02* (2018.01)
*H04W 56/00* (2009.01)
*H04L 67/125* (2022.01)

(58) Field of Classification Search
CPC ..... H04W 84/12; H04W 64/00; G01S 5/0284; H04L 67/125; H04L 67/12
USPC .................. 455/11.1–13.1, 41.1–41.2, 404.2, 455/414.1–414.2, 456.1–457
See application file for complete search history.

(56) References Cited

U.S. PATENT DOCUMENTS

| | | | |
|---|---|---|---|
| 2016/0140821 A1* | 5/2016 | Moeini | G08B 13/2462 340/572.1 |
| 2016/0224290 A1* | 8/2016 | Suzuki | G06F 3/1203 |
| 2017/0030995 A1* | 2/2017 | Khong | G01S 13/878 |
| 2018/0293291 A1* | 10/2018 | Pawar | G06F 16/27 |
| 2019/0090092 A1* | 3/2019 | Hwang | G01S 5/14 |

FOREIGN PATENT DOCUMENTS

| | | |
|---|---|---|
| CN | 105451231 | 3/2016 |
| CN | 106060777 | 10/2016 |
| CN | 107295461 | 10/2017 |

* cited by examiner

POSITIONING METHOD AND SYSTEM BASED ON WI-FI INTERNET OF THINGS DEVICE NETWORK

TECHNICAL FIELD

The present invention relates to a positioning method and system based on Wi-Fi IoT device network with (semi-) distributed computing and centralized positioning information management.

BACKGROUND ART

In recent years, indoor positioning and its application has become a hot topic with a broad application prospect. Various indoor positioning technologies are emerging with varied application scenarios. Generally, indoor positioning applications mainly include two aspects: indoor robotic device positioning and navigation, and indoor natural person positioning and navigation.

For indoor positioning and navigation of robotic devices, based on different operational requirements of indoor robots, it usually requires high positioning precision, varied types and functions of the necessary detection devices, complicated algorithms, high system requirements, and high cost for implementation. Common technologies for detection and positioning include: robotic vision positioning, ultrasonic radar, infrared detection, laser detection, radio frequency identification technology (RF-ID), SLAM technology, etc. In actual applications, two or more positioning technologies are often deployed in combination to realize precise positioning.

For indoor positioning and navigation of natural persons, precision requirements are relatively low, so it usually uses handheld smart device for local positioning, which is cumbersome to use, with low popularity of application, and currently does not support centralized positioning information management and navigation services for a large number of positioning targets. In actual applications, the following approaches are usually used:

1) positioning algorithms based on receiving signal strength indication (RSSI) information of a plurality of communication base stations or Wi-Fi access hotspots. However, usually the available communication base stations or Wi-Fi hotspots are few in numbers with low density of deployment, which is worsened by complicated degradation conditions of wireless channels, so positioning methods based on RSSI require complicated algorithms, and provide low reliability, and high error.

2) technologies based on UWB (Ultra-wideband), which utilize information of receiving signals of device, such as TOA (time of arrival), TDOA (time difference of arrival), AOA (angle of arrival), for positioning and navigation. Such positioning approach provides relatively high precision with simpler algorithms. However, it is complicated to customize and design circuits based on UWB, resulting in high hardware cost, and operating bands of such circuits are very high with high power consumption, so such a positioning approach is unable to achieve large scale application with low cost and low power consumption. Moreover, positioning technologies based on UWB provide positioning precision much higher than the positioning precision required for indoor natural persons in normal circumstances.

Usually, a positioning application for indoor natural persons has to position a large number of targets in a large indoor physical range in a centralized manner. Conventional technologies have not provided a solution that may meet the low cost and high performance requirements for applications under such circumstances.

With the advent of the IoT (Internet of Things) age, large numbers of domestic or commercial IoT devices are emerging in the market. Interconnections between IoT devices are usually implemented in accordance to certain wireless connection technologies. The 802.11 Wi-Fi wireless communication standards are one of the most widely used wireless access technology standards. In the field of IoT, the Wi-Fi IoT access mode is one of the IoT access modes with the widest application, lowest cost, and best extensibility.

Usually, a Wi-Fi IoT device accesses a network directly via Wi-Fi access point (Wi-Fi Access Point, also called as Wi-Fi hotspot or wireless router). However, with the increasing degree of integration and computing power of electronic devices and the decreasing device production cost, more and more commonly used device is provided with Wi-Fi IoT functionalities, so as to form a Wi-Fi IoT device network of considerable scale.

Under the circumstances of covering large physical range and including a large number of IoT devices, the large number of IoT devices usually adopt a certain topology structure (e.g., tree structure as most commonly seen) to realize interconnections, control, data transmissions, etc. Examples include Wi-Fi IoT illumination device network, Wi-Fi IoT environment monitoring device network (smoke, fire alarms), etc., in large range public areas. Generally, such IoT devices have positions relatively more fixed than those of the Wi-Fi access points, and have simpler functionalities, provide redundant data transmission and data processing resources are available from individual Wi-Fi IoT devices, and meanwhile, have relatively high density of devices and stable power supply. However, conventional technologies have not used these Wi-Fi IoT devices as reference points for positioning to utilize their redundant resources for indoor positioning, navigation, and tracking.

SUMMARY OF THE INVENTION

The present invention utilizes the networking structure of a Wi-Fi IoT device network, through an approach of synchronizing Wi-Fi local subnets, and utilizes TDOA information of receiving signal between subnet devices, so as to realize method and system for real-time positioning and monitoring a large number of targets in a large physical range.

In order to achieve the above described object, a technical solution of the present invention is to provide a positioning method based on a Wi-Fi IoT device network, which comprises:

selecting a plurality of positioning monitoring nodes from nodes of any one subnet of the Wi-Fi IoT device network, wherein a subnet master node of the subnet is one of the positioning monitoring nodes;

spatial position information of each of the positioning monitoring nodes and mutual physical distances between the positioning monitoring nodes are knowable;

a positioning target device transmits a data packet corresponding thereto;

each of all the positioning monitoring nodes in the subnet or all the other positioning monitoring nodes in the subnet except the subnet master node, respectively within an information receiving and transmitting range thereof, receives the data packet sent by the same positioning target device, records corresponding data packet receipt clock information, and provides the data packet receipt clock information and identification information of the positioning target device corresponding to the data packet to the subnet master node; and the subnet master node, according to information respectively provided by the plurality of positioning monitoring nodes, utilizes signal arrival time differences between the plurality of positioning monitoring nodes receiving the data packet from the same positioning target device to compute distance differences of the positioning target device with respect to the plurality of positioning monitoring nodes, and determines a position of the positioning target device in a physical coverage range of the subnet.

Preferably, the subnet master node periodically broadcasts local clock information, or the local clock information and clock distance adjust information of each positioning monitoring node, to other positioning monitoring nodes in the same subnet, such that the positioning monitoring nodes receiving the broadcast packet are allowed to adjust clock information offset, so as to ensure all the positioning monitoring nodes in the subnet have synchronized clocks.

Preferably, the positioning target device transmits a Beacon packet at a set period in a SoftAP mode, wherein the Beacon packet contains a MAC address of the positioning target device;

or, the positioning target device has two MAC addresses, wherein the positioning target device transmits, in the SoftAP mode and with a first MAC address, a Beacon packet containing the first MAC address at a set period, and the positioning target device connects, in an STA mode and with a second MAC address, to a nearby Wi-Fi access point, so as to obtain information sent by an IoT central control unit of the Wi-Fi IoT device network.

Preferably, any one positioning monitoring node locally maintains a positioning target device MAC address list, and periodically updates the list through the subnet master node;

the positioning monitoring node receives a Beacon packet sent by the positioning target device and supporting adjusting a transmitting period in MAC layer, and records a receipt time;

if a MAC address in the Beacon packet representing a sender of the Beacon packet is in the positioning target device MAC address list of the positioning monitoring node, then the positioning monitoring node provides information to the subnet master node corresponding thereto; and wherein the information includes the MAC address of the sender of the Beacon packet, the receipt time of the Beacon packet, a receiving signal strength RSSI value of the Beacon packet, or includes the MAC address of the sender of the Beacon packet, the receipt time of the Beacon packet, a receiving signal strength RSSI value of the Beacon packet, and detected information obtained by a sensing and detection module of the positioning target device.

Preferably, the period of transmitting data packets by any one of positioning target devices is adjusted according to a moving speed of the positioning target device in the subnet, and/or is adjusted according to a number of all the positioning target devices in the subnet, so as to avoid collision and congestion of data packets.

Preferably, the subnet master node divides the positioning monitoring nodes in the subnet into groups of two, wherein a curve of equal distance difference points of two positioning monitoring nodes in each group is:

$$d_{1T} - d_{2T} = (t1 - t2)c$$

$$d_{1T} = \sqrt{(x-x1)^2 + (y-y1)^2}$$

$$d_{2T} = \sqrt{(x-x2)^2 + (y-y2)^2}$$

wherein $d_{1T}$ and $d_{2T}$ are distances from the positioning target device to the two positioning monitoring nodes in each group, respectively; (t1, t2) are synchronized clock values when the two positioning monitoring nodes in each group receive the data packet in the subnet, respectively; electromagnetic wave signals travel at light speed c in the air; (x1, y1) and (x2, y2) are coordinates of the two positioning monitoring nodes in each group; and (x, y) is a coordinate of the positioning target device to be solved;

the subnet master node uses a coordinate of an intersection point between each two curves of equal distance difference points of all the groups as a possible position of the positioning target device; or, the subnet master node uses each two equations corresponding to the curves of equal distance difference points of all the groups to compute a solution value of (x, y) as a possible position of the positioning target device; and in order to determine two-dimensional positioning information of the positioning target device, using at least two curves of equal distance difference points or at least two equations obtained by dividing at least three positioning monitoring nodes into groups of two to compute the solution value of (x, y); or, in order to determine three dimensional positioning information of the positioning target device, using at least three curved surfaces of equal distance difference points or at least three equations in three variables obtained by dividing at least four positioning monitoring nodes into groups of two to compute the solution value of (x, y).

Preferably, any one subnet comprises a plurality of first positioning monitoring nodes that have known mutual distance information and spatial position information, and further comprises a plurality of second positioning monitoring nodes that are dynamically joined;

the distance information between the second positioning monitoring nodes and the first positioning monitoring nodes is obtained by performing computation of the positioning method based on a Wi-Fi IoT device network for a plurality of times, and averaging the distance information obtained through a plurality of times of computation;

wherein each positioning of the second positioning monitoring node includes the following process:

the second positioning monitoring node transmits, in the SoftAP mode, a positioning data packet including identification information of the second positioning monitoring node to the plurality of the first positioning monitoring nodes;

each of the first positioning monitoring nodes receives the positioning data packet and records a receipt time of the positioning data packet, and providing the receipt time and the identification information of the second positioning monitoring node to the subnet master node of the same subnet; and the subnet master node, according to the information provided by each of a plurality of first positioning monitoring nodes, utilizes differences between signal arrival times at which the plurality of first positioning monitoring nodes receive a same positioning data packet to compute the distance information between the second positioning monitoring nodes and the first positioning monitoring nodes.

Another technical solution according to the present invention is to provide positioning system based on a Wi-Fi IoT device network, which implements the any positioning method as above described; the subnet in the positioning method as described above is at any level from a plurality of levels of subnets of the Wi-Fi IoT device network.

According to the present invention positioning system based on a Wi-Fi IoT device network, a plurality of Wi-Fi IoT devices interconnected in a tree topology in the Wi-Fi IoT device network are divided into a plurality of subnets having different levels of depths according to a spatial distance between each Wi-Fi IoT device and a first level subnet master node corresponding thereto;

except for a plurality of first level subnet master nodes of the Wi-Fi IoT device network, the subnet master nodes of other level subnets are both the master node of a current level subnet and one of the sub nodes of an upper level subnet, and transmit a control command or data routed from the upper level subnet to the sub nodes in the current level subnet, and route data information generated by the sub nodes in the current level subnet to the subnet master node of the upper level subnet;

the sub nodes at each level and the positioning monitoring nodes selected therefrom are both controlled Wi-Fi IoT devices, which perform a corresponding operation when receive a control command, and feed back data information through the subnet master node in the same subnet; and wherein by combining information provided by the positioning monitoring nodes in the current level subnet, and positioning information of the same positioning target device provided by the master node of one or more lower level subnets, the subnet master node of the current level subnet obtains positioning information of the same positioning target device corresponding to the current level, and provides the positioning information to the subnet master node of the upper level subnet.

Preferably, a subnet at any level is provided with a plurality of subnet backup master nodes;

the subnet backup master node is one of the positioning monitoring nodes in the current level subnet; relative position information of the positioning monitoring nodes in the current level subnet is locally stored in the sub nodes, or stored in the master node and the subnet backup master nodes of the current level subnet; and the subnet backup master node is also one of the sub nodes of the upper level subnet, and is connected with the master node of the upper level subnet; when the current master node fails, the subnet backup master node in the current level subnet takes over bidirectional information routing function of the subnet master node.

Preferably, each of the plurality of first level subnet master nodes of the Wi-Fi IoT device network is capable of directly communicating with the IoT central control unit of the Wi-Fi IoT device network;

the IoT central control unit performs control and maintenance of the Wi-Fi IoT device network, and collects, updates, and tracks the position information of all the positioning target devices in a physical range covered by the whole Wi-Fi IoT device network;

preferably, the IoT central control unit further performs any one of or any combination of the following operations:

the IoT central control unit records the MAC address of the positioning target device, and transmits the MAC address to all the positioning monitoring nodes in the Wi-Fi IoT device network through a plurality of levels of subnets;

the IoT central control unit receives, through a plurality of levels of subnets, the detected information obtained by the sensing and detection module of the positioning target device, and performs monitoring and pre-warning on the detected information; the sensing and detection module monitors and acquires information from the positioning target device and/or nearby devices thereof, and the acquired detected information is included in the data packet of the positioning target device to be transmitted; and the IoT central control unit generates, according to the position information of the positioning target device collected from each level of the subnets, real-time positioning touring information or safe evacuation path information, and provides the real-time positioning touring information or safe evacuation path information to the positioning target device via each level of the subnets.

The positioning method and system according to the present invention utilizes the redundant data transmission and computing resources a large number of Wi-Fi IoT network devices in a large range; through time synchronization between devices in the subnet, realizes the information acquisition of signal arrival time differences (TDOA) between the positioning target and reference sub nodes in the subnet, and then performs initial processing of positioning information at each Wi-Fi IoT subnet master node in the subnet, and then passes the processed coarse positioning information level by level to upper levels; each level subnet master node, according to the collected coarse positioning information, further refines and processes more and more precise positioning information, until the central positioning processing system of the whole Wi-Fi IoT network processes and maintains the position information of all the positioning targets and other acquired information of the positioning targets in a centralized manner, and the central positioning processing system provides more monitoring, tracking, and navigation services.

DETAILED DESCRIPTION OF THE PREFERRED EMBODIMENTS

A particular embodiment of the present invention will be described with reference to the drawings.

Figure 1:
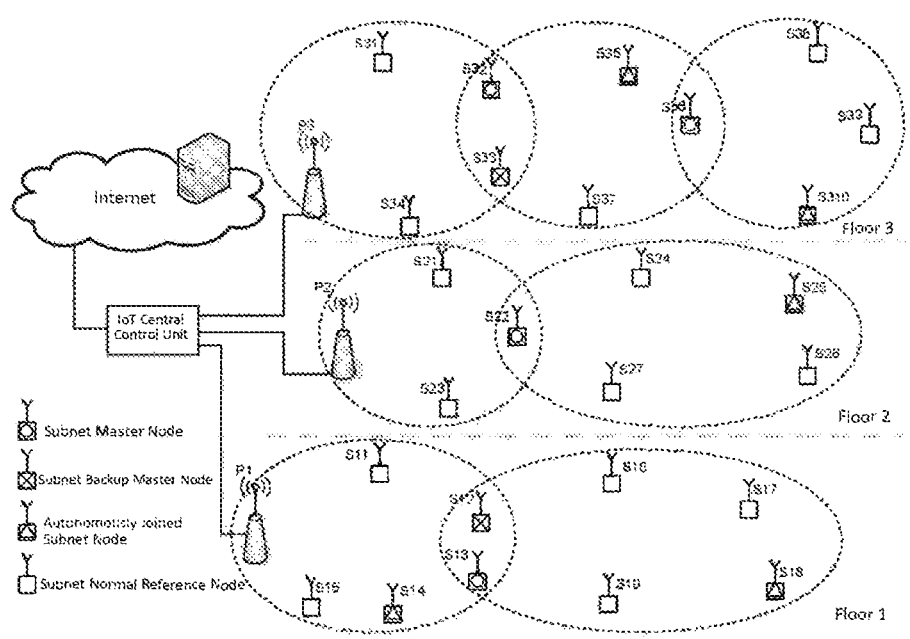
FIG. 1 is an illustrative diagram of a Wi-Fi IoT device network system.

FIG. 1 shows an exemplary system of a Wi-Fi IoT device network. The Wi-Fi IoT network covers a physical area including three floors, namely from floor 1 to floor 3. Each floor is provided with a first level subnet master node (master AP) with in direct communication with the IoT central control unit, i.e., P1 to P3. In each floor, all the other controlled Wi-Fi IoT device Sn are interconnected in a simple tree topology, and are connected with the IoT central control unit of the present system via the first level subnet master nodes, P1 to P3, so as to be controlled by the IoT central control unit to realize basic Wi-Fi IoT control functions (e.g., switching illumination devices, and acquiring environment detection information).

In the present embodiment, the network is in a tree topology (but the topology structure utilized by the present invention is not limited as such). The first level subnet master node is connected downwardly with a plurality of first level subnet sub nodes that are distributed in a certain spatial range, the first level subnet sub nodes being controlled by the first level subnet master node; some of the first level subnet sub nodes may act as second level subnet master nodes at the same time, which is connected with and control a plurality of the second level subnet sub nodes in a space extended from the edge of the space covered by the first level subnet, so as to form a second level subnet; for the same reason, with the increasing of the spatial coverage range, the depth of subnets may be increased constantly. Numerous Wi-Fi IoT devices of the whole system may, according to their spatial distances to the first level subnet master node, be divided into a plurality of subnets with different levels of depths. An upper level subnet may have a plurality of lower level subnets. FIG. 1 illustrates a special scenario, in which each upper level subnet only has one lower level subnet.

The following is a general description of the basic functions of the nodes in the Wi-Fi IoT network, and the specific functions of the nodes may vary depending on the specific applications:

In the Wi-Fi IoT, each Wi-Fi IoT subnet, despite of its network depth, has a subnet master node. Except for the first level subnet master nod, the current subnet master node is both the master node of the current level subnet and a sub node of the immediate upper level subnet. The current subnet master node is responsible for transmitting control command or data routed from the immediate upper level subnet to the sub nodes of the current subnet, and route data information generated by these sub nodes to the immediate upper level subnet master node.

Each subnet may further select some sub nodes with suitable positions as subnet backup master nodes, which takes over bidirectional information routing function of the subnet master node in case when the current subnet master node fails. A current level subnet sub node acting as a subnet backup master node must be a sub node of the immediate upper level subnet that may be connected with the immediate upper level subnet master node.

In the Wi-Fi IoT network, each node may be a controlled device, which, when having received a control command contained in the information routed to the sub node and relevant to the sub node, performs the control command, and feeds back relevant information according to protocols.

In order to realize the function of indoor positioning, the present Wi-Fi IoT system may need to add the following measures:

In each subnet, a number of subnet nodes with fixed positions are selected, and the physical distance between these selected reference nodes and spatial position information thereof are precisely determined. The selected reference subnet nodes must include the master node and all the subnet backup master nodes of the subnet. All the reference nodes selected in the subnet constitute a subnet positioning monitoring node set. The relative position information of the positioning monitoring nodes in the subnet may be locally stored in the sub nodes, or may be only stored in the subnet master node and the subnet backup master nodes.

Clock synchronization between the subnet positioning monitoring nodes in the subnet is achieved as follows: the subnet master node periodically broadcasts local clock information to other subnet positioning monitoring nodes in the same subnet; if the information of the subnet positioning monitoring nodes is only stored in the subnet master node, the broadcast packet may need to further include clock distance adjustment information for each subnet positioning monitoring node, so as to facilitate the subnet positioning monitoring nodes in adjusting synchronization clock offset. The subnet positioning monitoring nodes listen to the clock synchronization information from the master node, and according to its known physical distance from the current subnet master node, adjust the offset of the latest received clock information, such that all the positioning monitoring nodes in the same subnet have synchronized clocks.

The MAC address of the positioning target device is recorded in the IoT central control unit, and is broadcast via each level of the subnets to all the positioning monitoring nodes in the Wi-Fi IoT network. The positioning monitoring node locally maintains a positioning target device MAC address list, and periodically updates the list through the subnet master node.

In order to reduce the power consumption and physical size of the positioning target device, the positioning target device only supports the SoftAP mode, without needing to establish and maintain wireless connections with other Wi-Fi devices. A normal AP transmits Beacon packets at a period of about 100 ms. Because a natural person usually does not move in high speed, the period for transmitting positioning Beacon packets may be extended. Thus, in the system, the period of transmitting Beacon packets in the SoftAP mode may be appropriately lengthened according to the number of positioning target devices in the system, so as to reduce the collision and congestion of positioning Beacon packets in radio channels. In the Wi-Fi protocols, lengthening the Beacon packet period in MAC layer is supported, with a step of an integer times of 100 ms. The Beacon packet period may satisfy the requirements for the indoor tracking and positioning of moving natural persons.

The positioning target device, in a normal operating state, may transmit Beacon packets including the MAC address of the device according to the configured Beacon period. The packet may also, according to the application protocols, carry the device other monitoring and acquired information, such as body temperature, heartbeat, and blood pressure information from a simple medical monitoring device.

The positioning monitoring node in a subnet of the Wi-Fi IoT network, if having received a Beacon packet, will record a synchronized clock value corresponding to the receipt of the packet in the local subnet. if the sending MAC address in the packet is found in the positioning target device MAC address list locally on the positioning monitoring node, then the positioning monitoring node will transmit the received MAC address, the receipt time of the Beacon packet, a receiving signal strength RSSI value of the Beacon packet and other detected information transmitted by the Beacon packet to the subnet master node corresponding thereto.

After having received the MAC address of a certain positioning target device and Beacon packet receiving clock information transmitted by a sufficient number of the subnet positioning monitoring nodes, the subnet master node may, according to this information, compute the differences between the distances from the positioning target device to a plurality of positioning monitoring nodes, and further determine the position of the positioning target device in the subnet physical coverage range.

The subnet master node performs positioning of the positioning target device based on the signal arrival time differences (TDOA) between the positioning monitoring nodes receiving a same Beacon packet, because the relative positions of the positioning monitoring nodes are precisely known, and so simple geometric algorithms may be utilized to obtain relatively precise positioning information of the positioning target device.

Figure 2:
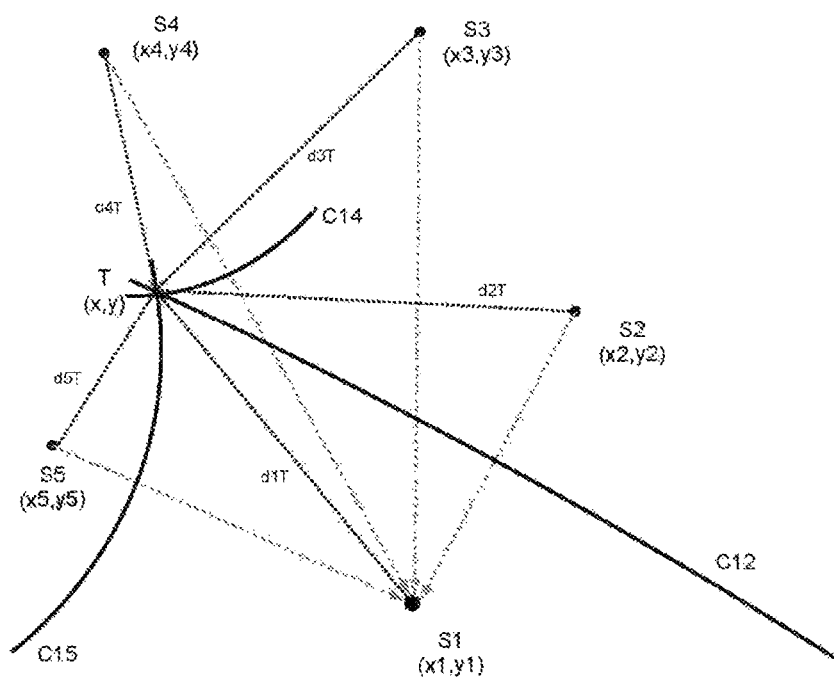
FIG. 2 is an exemplary diagram of a process of two-dimensional planar positioning a positioning target device by a subnet master node.

FIG. 2 shows an exemplary diagram of a process for two-dimensional planar positioning a positioning target device by a subnet master node. The subnet contains five positioning monitoring nodes, namely S1 to S5, which are distributed in a two-dimensional plane. Among the nodes, S1 is the subnet master node. According to the relative spatial positions between the positioning monitoring nodes, any point in the space may be selected as the origin of the two-dimensional coordinates, and obtains the corresponding positioning monitoring node coordinates from (x1, y1) to (x5, y5). In the figure, the red crossed position is the position of the positioning target device T, which has unknown coordinates of (x, y).

The positioning target device T transmits a Beacon packet, and S1 to S5 receive the Beacon packet and locally record a synchronized clock value when receiving the packet in the subnet, which is labeled as t1 to t5. Subsequently, S2 to S5 transmit the information of the positioning target device T received thereby and clock information t2 to t5 to the subnet master node S1, and at this point, S1 has obtained all the information about the receipt of the Beacon packet from the positioning target device T by all the subnet positioning monitoring nodes.

S1 obtains (t1, t2, t3, t4, t5) and utilizes the TDOA information, so as to estimate the coordinate position (x, y) of the positioning target device T. The distances from the positioning target device T to the subnet positioning monitoring nodes S1 to S5 are labeled as: $d_{1T}$, $d_{2T}$, $d_{3T}$, $d_{4T}$, and $d_{5T}$. The electromagnetic wave signals travel at light speed c in the air.

Equal distance difference points with respect to S1 and S2 may be represented by one line of a hyperbola:

$$d_{1T} - d_{2T} = (t1-t2)c.$$

As shown by the curve C12 in the figure, in which $$d_{1T} = \sqrt{(x-x1)^2 + (y-y1)^2}, \ d_{2T} = \sqrt{(x-x2)^2 + (y-y2)^2}$$

In a similar way, curves consisting of equal distance difference points between each two points selected from other subnet positioning monitoring nodes may be obtained, as shown in the figure by C14 and C15. Each two curves selected from all the obtainable curves of equal distance difference points may have an intersection point (or each two equations selected from the system of equations consisting of all the above described equations may have a solution of (x, y)), which is the possible position of the positioning target device T.

Due to influences of timing error, non-line-of-sight/multipath transmission etc., the intersection points of different curves obtained as above described may not be a same point, but may be distributed in a certain range. the more the information obtained from different subnet positioning monitoring nodes by the subnet master node, the more the solutions will be obtained for the possible position of the positioning target device, and the easier for the subnet master node to exclude unreliable points deviating too far from a main range, thereby improving the positioning precision of the positioning target device.

The determination of two-dimensional positioning information requires synchronized positioning information from at least three subnet positioning monitoring nodes, forming at least two curves of equal distance difference points, and solving the intersection points. In comparison, the determination of three dimensional positioning information requires synchronized positioning information from at least four subnet positioning monitoring nodes, a curved surface of equal distance difference points is formed between each two subnet positioning monitoring nodes, and an intersection point of three curved surfaces of equal distance difference points (or a solution of three equations in three variables) will be a possible three dimensional positioning coordinate point of the positioning target device.

The subnet master nodes pass the obtained positioning information up level by level. The immediate upper level subnet master node knows information about a larger spatial structure, e.g., more detailed space partitioning information. Thus, the immediate upper level subnet master node may perform further processing by utilizing the positioning information for the same positioning target device from different subnets. For example, the positioning information and RSSI information from the subnets may be combined to more precisely determine the cross-floor information or wall partitioning information of the positioning target.

The processing of the positioning information may, according to the particular application and the specific conditions of the monitored space, be distributed among the subnet master nodes, which may significantly reduce the volume of data to be transmitted in the, and relieve the burden of processing primary positioning information which is mostly performed by the IoT central control unit.

The positioning and monitoring information from each level of the subnet master nodes is finally collected by the IoT central control unit. In addition to the basic control and maintenance of the Wi-Fi IoT network, the IoT central control unit is also responsible for maintaining the update and tracking of the positioning information all the positioning target devices and other services (e.g., health condition monitoring of target natural persons) in the whole physical range covered by the Wi-Fi IoT network.

In each subnet, in addition to the positioning monitoring nodes that have relative distance information and spatial position information precisely determined during the initial deployment of the Wi-Fi IoT network, new positioning monitoring nodes may be joined autonomously during the subsequent operations. The positions of these newly joined positioning monitoring nodes may be fixed, or semi-fixed (changed occasionally); the distance information between the newly joined and the existing positioning monitoring nodes does not have to be measured manually, but may be determined in the following manner based on the above described positioning method for a positioning target device, in the SoftAP mode, a newly joined positioning monitoring node transmits a Beacon packet containing its own information to all the existing positioning monitoring nodes in the subnet; and the positioning precision of the newly joined node may be improved by measuring the relative position of the newly joined node and the existing nodes for multiple times, averaging, and progressive approximation. After the positioning algorithm of the master node of the subnet determines the positioning information of the node is already within a range of allowable error for positioning monitoring nodes, the node may also act as an autonomously joined positioning monitoring node to participate in the positioning and monitoring of the positioning target device.

At the time of initial deployment, it is only required to manually measure the spatial position information of a least number of positioning monitoring nodes, and the subsequent positioning monitoring nodes may be autonomously joined and autonomously measured, thereby increasing the device redundancy, coverage range and positioning precision of the system. The method of the invention may significantly save the labor required to deploy the positioning monitoring nodes, and facilitate easy and quick deployment of the positioning network.

Due to the large number and high density of deployment of devices in the Wi-Fi IoT device network, the system of the invention provides high redundancy and strong robustness of the positioning system based on the Wi-Fi IoT device network. At the same time, abundant signal acquisition and rich input information for positioning algorithms, in combination with RSSI information, may eliminate the influence of non-line-of-sight positioning information, thereby providing auto-correction ability, precise positioning, and more flexible and simpler algorithm design.

For a positioning algorithm that is based on synchronization of subnet clocks and utilizes time difference of arrival (TDOA) of signals, its positioning precision depends on the baseband clock used for synchronization. The higher the Wi-Fi signal bandwidth, the higher the baseband clock frequency, and the higher the positioning precision. Due to the large number of positioning monitoring devices in the subnet, a simple positioning algorithm may be utilized to ensure good positioning precision. The positioning system based on the above described method may easily achieve a positioning precision within 1 meter in a large range indoor space. For the of positioning and navigation applications for indoor natural persons, such a precision is sufficient. It shall be noted that, although indoor positioning is described as an example, if positioning monitoring nodes in an outdoor environment Wi-Fi IoT device network have corresponding functions and deployment conditions (e.g., distances/positions being precisely known, receipt time of positioning target device information being recorded, and transmitting data required for positioning to the subnet master node, but the invention is not limited as such), then the positioning method of the present invention may be also be applied in the outdoor environment.

The present invention mainly has two application scenarios:

1) Uni-directional positioning information collection and management, e.g., patient positioning management in hospitals, elder person positioning in nursing homes, kindergartens, special caring institutions, and positioning physical positions of workers in large factories.

In this application scenario, the positioning target device requires minimally a Wi-Fi transmission module that may support SoftAP mode, which may provide a simplest and lightest structure, will not increase the burden of wearing by a natural person to be positioned, neither requires any interactions with the natural person to be positioned.

In special applications, the positioning target device may be integrally loaded with other function modules, and for example, information acquired by health data monitoring modules in healthcare applications such as body temperature, heartbeat, and blood pressure, may be returned to the IoT central control unit along with the positioning information. The IoT central control unit may, according to the health monitoring information, monitor the physical conditions of patients or elder persons in real-time, and provides pre-warnings in real-time, so as to deliver positioning information, so as to provide necessary assistance in time, which may save large amount of labors for caring, and significantly improve system response speed, and increasing the efficiency of caring and emergency medical services.

2) Uni-directional positioning information collection and management, and then returning navigation information obtained from processing by the IoT central control unit to a local device, e.g., indoor low power consumption handheld/wearable navigation touring devices for large exhibition centers.

In this application scenario, the positioning target device needs to support both Wi-Fi modes, and use two MAC addresses simultaneously: SoftAP mode for transmitting a positioning Beacon packet; and STA mode for connecting with a nearby Wi-Fi access point, so as to obtain real-time positioning touring information from a server/the IoT central control unit, or in emergencies, obtain optimal safe evacuation path information pushed from the server, etc.

The IoT central control unit manages and maintains positioning information in a centralized manner, which may facilitate, under emergencies (e.g., fire), rapidly computing the optimal evacuation and rescue plans and paths, monitoring safe evacuation conditions in real-time, thereby helping provide the most effective rescue safe evacuation resource allocation.

Although the content of the present invention is described in detail through the above described preferred embodiments, it shall be understood that the above description should not be considered as limiting the present invention. After reviewing the above content, various modification and substitution to the present invention will become apparent to a person skilled in the art. Thus, the scope of protection of the present invention shall be defined by the appended claims

The invention claimed is:

1. A positioning method based on a Wi-Fi IoT device network, comprising:
   selecting a plurality of positioning monitoring nodes from nodes of any one subnet of the Wi-Fi IoT device network, wherein a subnet master node of the subnet is one of the positioning monitoring nodes;
   spatial position information of each of the positioning monitoring nodes and mutual physical distances between the positioning monitoring nodes are knowable;
   a positioning target device transmits a data packet corresponding thereto;
   each of all the positioning monitoring nodes in the subnet or all the other positioning monitoring nodes in the subnet except the subnet master node, respectively within an information receiving and transmitting range thereof, receives the data packet sent by the same positioning target device, records corresponding data packet receipt clock information, and provides the data packet receipt clock information and identification information of the positioning target device corresponding to the data packet to the subnet master node; and
   the subnet master node, according to information respectively provided by the plurality of positioning monitoring nodes, utilizes signal arrival time differences between the plurality of positioning monitoring nodes receiving the data packet from the same positioning target device to compute distance differences of the positioning target device with respect to the plurality of positioning monitoring nodes, and determines a position of the positioning target device in a physical coverage range of the subnet;
   wherein any one positioning monitoring node locally maintains a positioning target device MAC address list, and periodically updates the list through the subnet master node;
   the positioning monitoring node receives a Beacon packet sent by the positioning target device and supporting adjusting a transmitting period in MAC layer, and records a receipt time;
   when a MAC address in the Beacon packet representing a sender of the Beacon packet is in the positioning target device MAC address list of the positioning monitoring node, then the positioning monitoring node provides information to the subnet master node corresponding thereto; and
   wherein the information includes the MAC address of the sender of the Beacon packet, the receipt time of the Beacon packet, a receiving signal strength RSSI value of the Beacon packet, or includes the MAC address of the sender of the Beacon packet, the receipt time of the Beacon packet, a receiving signal strength RSSI value of the Beacon packet, and detected information obtained by a sensing and detection module of the positioning target device.

2. The positioning method according to claim 1, wherein the subnet master node periodically broadcasts local clock information, or the local clock information and clock distance adjust information of each positioning monitoring node, to other positioning monitoring nodes in the same subnet, such that the positioning monitoring nodes receiving the broadcast packet are allowed to adjust clock information offset, so as to ensure all the positioning monitoring nodes in the subnet have synchronized clocks.

3. The positioning method according to claim 1, wherein the positioning target device transmits a Beacon packet at a set period in a SoftAP mode, wherein the Beacon packet contains a MAC address of the positioning target device; or, the positioning target device has two MAC addresses, wherein the positioning target device transmits, in the SoftAP mode and with a first MAC address, a Beacon packet containing the first MAC address at a set period, and the positioning target device connects, in an STA mode and with a second MAC address, to a nearby Wi-Fi access point, so as to obtain information sent by an IoT central control unit of the Wi-Fi IoT device network.

4. The positioning method according to claim 1, wherein the period of transmitting data packets by any one of positioning target devices is adjusted according to a moving speed of the positioning target device in the subnet, and/or is adjusted according to a number of all the positioning target devices in the subnet, so as to avoid collision and congestion of data packets.

5. The positioning method according to claim 1, wherein the subnet master node divides the positioning monitoring nodes in the subnet into groups of two, wherein a curve of equal distance difference points of two positioning monitoring nodes in each group is:

$$d_{1T} - d_{2T} = (t1 - t2)c$$

$$d_{1T} = \sqrt{(x-x1)^2 + (y-y1)^2}$$

$$d_{2T} = \sqrt{(x-x2)^2 + (y-y2)^2}$$

wherein $d_{1T}$ and $d_{2T}$ are distances from the positioning target device to the two positioning monitoring nodes in each group, respectively; (t1, t2) are synchronized clock values when the two positioning monitoring nodes in each group receive the data packet in the subnet, respectively; electromagnetic wave signals travel at light speed c in the air; (x1, y1) and (x2, y2) are coordinates of the two positioning monitoring nodes in each group; and (x, y) is a coordinate of the positioning target device to be solved;

the subnet master node uses a coordinate of an intersection point between each two curves of equal distance difference points of all the groups as a possible position of the positioning target device; or, the subnet master node uses each two equations corresponding to the curves of equal distance difference points of all the groups to compute a solution value of (x, y) as a possible position of the positioning target device; and in order to determine two-dimensional positioning information of the positioning target device, using at least two curves of equal distance difference points or at least two equations obtained by dividing at least three positioning monitoring nodes into groups of two to compute the solution value of (x, y); or, in order to determine three dimensional positioning information of the positioning target device, using at least three curved surfaces of equal distance difference points or at least three equations in three variables obtained by dividing at least four positioning monitoring nodes into groups of two to compute the solution value of (x, y).

6. The positioning method according to claim 3, wherein any one subnet comprises a plurality of first positioning monitoring nodes that have known mutual distance information and spatial position information, and further comprises a plurality of second positioning monitoring nodes that are dynamically joined;

the distance information between the second positioning monitoring nodes and the first positioning monitoring nodes is obtained by performing computation of the positioning method based on a Wi-Fi IoT device network for a plurality of times, and averaging the distance information obtained through a plurality of times of computation;

wherein each positioning of the second positioning monitoring node includes the following process:

the second positioning monitoring node transmits, in the SoftAP mode, a positioning data packet including identification information of the second positioning monitoring node to the plurality of the first positioning monitoring nodes;

each of the first positioning monitoring nodes receives the positioning data packet and records a receipt time of the positioning data packet, and providing the receipt time and the identification information of the second positioning monitoring node to the subnet master node of the same subnet; and the subnet master node, according to the information provided by each of a plurality of first positioning monitoring nodes, utilizes differences between signal arrival times at which the plurality of first positioning monitoring nodes receive a same positioning data packet to compute the distance information between the second positioning monitoring nodes and the first positioning monitoring nodes.

7. A positioning system based on a Wi-Fi IoT device network, which implements the positioning method according to claim 1, wherein the subnet is at any level from a plurality of levels of subnets of the Wi-Fi IoT device network;

a plurality of Wi-Fi IoT devices interconnected in a tree topology in the Wi-Fi IoT device network are divided into a plurality of subnets having different levels of depths according to a spatial distance between each Wi-Fi IoT device and a first level subnet master node corresponding thereto;

except for a plurality of first level subnet master nodes of the Wi-Fi IoT device network, the subnet master nodes of other level subnets are both the master node of a current level subnet and one of the sub nodes of an upper level subnet, and transmit a control command or data routed from the upper level subnet to the sub nodes in the current level subnet, and route data information generated by the sub nodes in the current level subnet to the subnet master node of the upper level subnet;

the sub nodes at each level and the positioning monitoring nodes selected therefrom are both controlled Wi-Fi IoT devices, which perform a corresponding operation when receive a control command, and feed back data information through the subnet master node in the same subnet; and wherein by combining information provided by the positioning monitoring nodes in the current level subnet, and positioning information of the same positioning target device provided by the master node of one or more lower level subnets, the subnet master node of the current level subnet obtains positioning information of the same positioning target device corresponding to the current level, and provides the positioning information to the subnet master node of the upper level subnet.

8. The positioning system according to claim 7, wherein a subnet at any level is provided with a plurality of subnet backup master nodes;

the subnet backup master node is one of the positioning monitoring nodes in the current level subnet; relative position information of the positioning monitoring nodes in the current level subnet is locally stored in the sub nodes, or stored in the master node and the subnet backup master nodes of the current level subnet; and the subnet backup master node is also one of the sub nodes of the upper level subnet, and is connected with the master node of the upper level subnet; when the current master node fails, the subnet backup master node in the current level subnet takes over bidirectional information routing function of the subnet master node.

9. The positioning system according to claim 7, wherein each of the plurality of first level subnet master nodes of the Wi-Fi IoT device network is capable of directly communicating with the IoT central control unit of the Wi-Fi IoT device network;

the IoT central control unit performs control and maintenance of the Wi-Fi IoT device network, and collects, updates, and tracks the position information of all the positioning target devices in a physical range covered by the whole Wi-Fi IoT device network;

preferably, the IoT central control unit further performs any one of or any combination of the following operations:

the IoT central control unit records the MAC address of the positioning target device, and transmits the MAC address to all the positioning monitoring nodes in the Wi-Fi IoT device network through a plurality of levels of subnets;

the IoT central control unit receives, through a plurality of levels of subnets, the detected information obtained by the sensing and detection module of the positioning target device, and performs monitoring and pre-warning on the detected information; the sensing and detection module monitors and acquires information from the positioning target device and/or nearby devices thereof, and the acquired detected information is included in the data packet of the positioning target device to be transmitted; and the IoT central control unit generates, according to the position information of the positioning target device collected from each level of the subnets, real-time positioning touring information or safe evacuation path information, and provides the real-time positioning touring information or safe evacuation path information to the positioning target device via each level of the subnets.

* * * * *

UNITED STATES PATENT AND TRADEMARK OFFICE
CERTIFICATE OF CORRECTION

PATENT NO. : 11,310,761 B2
APPLICATION NO. : 16/489877
DATED : April 19, 2022
INVENTOR(S) : Rui Zhan It is certified that error appears in the above-identified patent and that said Letters Patent is hereby corrected as shown below:

On the Title Page

Item (30) The Foreign Application Priority Date Number reads:
"20170353122.2"
Should read:
--201710353122.2--

Signed and Sealed this
Twelfth Day of July, 2022

Katherine Kelly Vidal
*Director of the United States Patent and Trademark Office*